Patented Feb. 12, 1952

2,585,537

UNITED STATES PATENT OFFICE 2,585,537

BETA-METHYLENE-BETA-PROPIOLACTONE COPOLYMERS

Donald D. Coffman, Wilmington, Del., assignor to E. I. du Pont de Nemours & Company, Wilmington, Del., a corporation of Delaware No Drawing. Application October 21, 1949, Serial No. 122,839

7 Claims. (Cl. 260—78.5)

This invention relates to new compositions of matter, and more particularly to resinous compositions comprising polymerized beta-methylene-beta-propiolactone, and to methods for obtaining these resinous compositions.

The preparation of beta - methylene - beta-propiolactone is described on pages 127 to 135 in vol. III of "Organic Reactions," John Wiley and Sons, Inc. (1946). Structurally it conforms to the following formula:

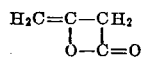

Attempts have been made previously to polymerize beta-methylene-beta-propiolactone, but only low polymers containing five to six polymer units have been obtained. I have found, however, that when this compound is copolymerized with other polymerizable materials in accordance with the invention described herein, high molecular weight polymers are obtained which possess valuable film-forming and other desirable properties which adapt them to a wide field of utility in the resin art.

This invention has as an object a new type of high molecular weight polymeric material. A further object is a new and useful resinous composition of matter comprising polymerized beta-methylene-beta-propiolactone. Further objects reside in methods for obtaining these compositions of matter.

The polymeric materials of this invention are obtained by copolymerizing, in contact with an azo, peroxy, or other catalyst capable of yielding free radicals, beta-methylene-beta-propiolactone and a copolymerizable organic compound containing ethylenic unsaturation.

The structure of the vinyl polymers described herein is quite different from that of the previously known low molecular weight products obtained by polymerizing beta-methylene-beta-propiolactone alone by means of ionic catalysts. In these previously known products the polymer units contain pyrone rings. For example, the dimer of beta-methylene-beta-propiolactone is dehydroacetic acid, 2-hydroxy-6-methyl-3-acetyl-gamma-pyrone. Other pyrones, such as 2,6-dimethyl-gamma-pyrone, are formed in smaller amounts during the polymerization reaction. In contrast, the copolymers of this invention behave as though they contain the beta-propiolactone ring, e. g.,

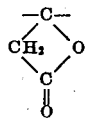

wherein the ring carbon is shown as a part of the main polymer chain. For example, the infra red spectrum shows the presence of lactone units in the copolymer, and hydrolysis opens the lactone ring to the hydroxy acid.

In obtaining the present copolymers the polymerizing conditions used with regard to temperature, pressure, time, and selection of catalyst may vary considerably depending upon the particular ethylenically unsaturated compound which is selected for copolymerization with the beta-methylene-beta-propiolactone. If the ethylenically unsaturated compound is normally liquid, for example, acrylonitrile, vinyl acetate, etc., the copolymers are best made at atmospheric pressure. In practice a reactor fitted with a stirrer and an efficient condenser is charged with a solvent, which is unreactive with the beta-methylene-beta-propiolactone under the conditions used, a free radical-generating catalyst, and the ethylenically unsaturated organic compound. The beta-methylene-beta-propiolactone is then added with stirring and the mixture maintained at 0° to 150° C. for from 1 to 24 hours. Thereafter, the reactor is discharged and the product isolated by steam distillation, precipitation, or other means known to those skilled in the art.

When the ethylenically unsaturated organic compound is normally gaseous, for example, ethylene or vinyl chloride, a closed reactor is charged with the beta-methylene-beta-propiolactone, an organic solvent which is unreactive with the beta-methylene-beta-propiolactone under the conditions used, and a free radical-generating catalyst. The reactor is cooled to 0° C. or below, swept with oxygen-free nitrogen, and then evacuated. The ethylenically unsaturated organic compound is then added, the reactor closed, and agitation is started. The reaction mixture is maintained at 0° C. to 150° C. until there is no further pressure drop. Throughout the reaction period the pressure is maintained at the selected level by repressuring with the ethylenically unsaturated organic compound, by adding beta-methylene-beta-propiolactone, or both. After reaction is complete, the reactor is opened, discharged, and the reaction mixture subjected to steam distillation, precipitation, or other means known to those skilled in the art for isolating the desired copolymer.

The following examples further illustrate the practice of this invention.

Example I

A solution of 20 g. of acrylonitrile, 20 g. of beta-methylene-beta-propiolactone, and 0.1 g. of azobis-isobutyronitrile in 80 g. of benzene was refluxed for 4 hours. The reaction mixture became cloudy as it approached its reflux temperature of approximately 80° C. The polymer was filtered from the reaction mixture, washed with fresh benzene and oven dried to yield 6.7 g. of a cream-colored, finely pulverized powder. Solubility of the polymer resembled that of polyacrylonitrile, being insoluble in many common organic solvents. The sticking temperature of the powder on a metal block was about 155° C. Anal. Calc'd for $C_{28}H_{28}N_8O_2$: N, 22.0. Found: N, 22.27, 22.14, which corresponds to a product containing an acrylonitrile/beta-methylene-beta-propiolactone mole ratio of 8:1.

Example II

An experiment similar to that of Example I was performed except that 0.1 g. of benzoyl peroxide was employed instead of the corresponding quantity of the azo catalyst. The polymer weighed 2.6 g. and had a nitrogen content of 22.02, 21.99.

Example III

A suspension of 13.2 g. of acrylonitrile, 13.2 g. of beta-methylene-beta-propiolactone, and 0.88 g. of pyridinium hydrazodisulfonate in 220 g. of distilled water was prepared and chilled to 0° C. To the stirred suspension 3.5 cc. (an excess) of an 8% sodium hypochlorite solution, diluted with 50 cc. of water, was added drop-wise over a period of one hour, while maintaining the reaction mixture at 0±2° C. Stirring under nitrogen at this low temperature was continued for a total of 2 hours and the polymeric product removed by filtration and washed successively with water, alcohol and ether. The dry weight of the polymeric product was 4.7 g. and nitrogen analysis showed it to contain 23.44 and 23.34% nitrogen. This copolymer contains an acrylonitrile/beta-methylene-beta-propiolactone mole ratio of 12/1.

Example IV

Maleic anhydride (24.5 g.) and beta-methylene-beta-propiolactone (21 g.) were copolymerized by refluxing in 200 g. of benzene in the presence of 5.0 g. of azobis-isobutyronitrile. A polymeric product began to precipitate as soon as the temperature approached the reflux temperature of the solution and at the end of two and one-half hours the gelatinous reaction mixture was too stiff to stir further. After filtration of the reaction mixture, washing the product with benzene and thoroughly drying in a vacuum oven, the maleic anhydride/beta-methylene-beta-propiolactone copolymer was obtained as a white, finely divided powder in a yield of 39.73 g. This polymer was soluble in water, alcohol, dioxane, acetone and many other common organic solvents and softened on a metal block at a temperature of approximately 140° C. This copolymer contains a maleic anhydride/beta-methylene-beta-propiolactone mole ratio of 1/1.

Example V

A solution of 40 g. of beta-methylene-beta-propiolactone, 2 g. of azobis-isobutyronitrile and 5 g. of tert.-butyl alcohol in 160 cc. of thiophene-free benzene was charged to a 500 cc. stainless steel autoclave. Air was swept from the autoclave with nitrogen and the contents frozen and further freed from oxygen by alternate evacuation and flushing with nitrogen. To the frozen bomb was added 160 g. of vinyl chloride and polymerization was conducted by heating and shaking at 60° C. for 18 hours under autogenous pressure. Upon completion of the reaction period the autoclave was bled to the atmosphere, opened and a white, stiff, opaque jelly removed. This gelatinous material was dissolved in acetone and precipitated in granular form by pouring the acetone solution into methanol while stirring vigorously. When dried under a vacuum pump pressure at room temperature, the white, solid, granular polymer weighed 160 g. This product was further purified by redissolving in 300 cc. of acetone, reprecipitating in methanol and drying at room temperature under the low pressure produced by an oil pump. Analysis indicated 49.67 and 49.74% chlorine, corresponding to 87.5% vinyl chloride and 12.5% beta-methylene-beta-propiolactone. Films could be pressed from this polymer at 140° C. This copolymer contains a vinyl chloride/beta-methylene-beta-propiolactone mole ratio of 9.6/1.

Example VI

A solution of 60 g. of beta-methylene-beta-propiolactone and 4 g. of azobis-isobutyronitrile in 400 g. of cyclohexane was added to a 1200 cc. capacity rocking autoclave. After removal of air in the usual fashion, pressure was increased to 1000 atm. by means of ethylene and the temperature to 80° C., these conditions being maintained for 2 hours. It was necessary to repressure with ethylene from time to time to maintain the pressure at between 600-1000 atm. Carbon and hydrogen analysis of the resulting polymer (74 g.) showed that it contained 96% ethylene or a mole ratio of 72.1. In another experiment of a similar nature except that ditert.-butyl peroxide (0.4 g.) was employed as the catalyst at a temperature of 140° C. the percent ethylene was 82.4% calculated from the carbon-hydrogen values, which corresponds to a mole ratio of 14:1.

Example VII

In a manner similar to the above experiments, allyl hexyl ether was copolymerized with beta-methylene-beta-propiolactone. From a charge consisting of 35.5 g. of the allyl compound, 21 g. of beta-methylene-beta-propiolactone, 100 g. of benzene and 10 g. of 1,1'-azodicyclohexanecarbonitrile refluxed for 24 hours, there was obtained 32 g. of copolymer. The copolymer was isolated by steam distillation of the reaction mixture and dried. Anal. Calc'd for 3/1 allyl hexyl ether/beta-methylene-beta-propiolactone copolymer: C, 73.0; H, 11.4. Found: C, 73.17, 72.88; H, 10.18, 10.27. This copolymer contains an allyl hexyl ether/beta-methylene-beta-propiolactone mole ratio of 3/1.

The products of this invention may be prepared at temperatures of from 0° to 150° C. Since good reaction rates, with high product yields, are obtained at 25° to 80° C., this constitutes the preferred operating temperature range. The exact temperatures employed within this range will depend in major part on the particular free radical-generating catalyst employed. All other factors being equal, it is desirable to select as low a temperature as possible since higher molecular weight, more stable and less discolored products are obtained.

The pressure conditions employed in the preparation of the copolymers of this invention depend upon the nature of the monomer or monomers being copolymerized with the beta-methylene-beta-propiolactone. If the monomer or monomers are normally liquid then the copolymers are conveniently prepared in an open reactor at atmospheric pressure. On the other hand, with gaseous monomers or at temperatures above the boiling point of beta-methylene-beta-propiolactone, closed reactors may be used under autogenous pressures or under externally applied pressures up to 3,000 atmospheres or above.

Catalysts which are useful in preparing the copolymers of this invention are those which are capable of yielding free radicals under the conditions of reaction. They are substances which are effective in the homopolymerization of ethylene to solid polymers. Examples are azo compounds containing an acylic azo, —N=N—, group having bonded to nitrogen a discrete carbon atom of the class consisting of aliphatic and cycloaliphatic carbon atoms, at least one being tertiary and one of the carbon atoms bonded to said tertiary carbon atom having its remaining valences satisfied by only elements of the class consisting of oxygen and nitrogen. These compounds are more fully described in U. S. Patent 2,471,959. Illustrative of such compounds are alpha, alpha'-azobis-(alpha,gamma-dimethylvaleronitrile), dimethyl and diethyl alpha, alpha'-azodiisobutyrate, 1,1'-azodicyclohexanecarbonitrile, alpha, alpha'-azobis(alpha-ethylbutyronitrile), alpha, alpha' - azodiisobutyrocarbonamide, alpha(carbamylazo)isobutyronitrile, etc. Examples of other compounds operable as catalysts are azines, oximes, amine oxides, peroxy compounds, such as organic peroxides, hydroperoxides, and percarboxylates, etc. Specific examples are benzoyl peroxide, diethyl peroxide, t-butyl pentamethyl peroxide, di-t-butyl peroxide, t-butyl hydroperoxide, ethyl hydroperoxide, benzalazine, diphenylketazine, acetoxime, camphoroxime, trimethyl amine oxide, etc.

It is also possible to use combinations of chemicals either of which alone may or may not initiate polymerization. These combinations may include, for example, oxidizing and reducing agents which upon reaction liberate polymerization-initiating products, as for example, the well-known persulfate-bisulfite system. The free-radical generating substance may be present in the form of an inactive precursor which may, by reaction with a second agent, be converted into the active form, or alternately additional materials may be added which, while sharing no active part in the polymerization, promote, sensitive or activate the true initiator such as, for example, salts of heavy metals such as iron or copper. Likewise it may be found desirable under special conditions to use combinations of the above-mentioned catalysts if, for example, it is desired to carry the reaction out in a series of stages. Compounds which are capable of generating free radicals when activated by light can also be used if desired. Examples of such compounds are benzoin, biacetyl, uranyl nitrate, etc.

The catalyst concentration may be varied over a wide range. For reasons of economy, it is desirable to use as small an amount of catalyst as possible, for example, 0.1% by weight of the polymerizable monomers plus the beta-methylene-beta-propiolactone in the charge. If desired, as much as 25% of catalyst may be used but generally an amount of from 0.4 to 20% is employed because it represents a proper balance between reaction rate and economy.

The mole ratio of beta-methylene-beta-propiolactone to polymerizable ethylenically unsaturated monomer or monomers may be varied from 99:1 to 1:99, depending upon the mole ratio desired in the final product. Although the present copolymers, even when they contain but relatively small amounts of either of the comonomers, differ considerably from the homopolymer of the monomers, it is usually preferred to maintain the mentioned mole ratio between 1:1 and 1:50.

The copolymers of this invention may be prepared with only the beta-methylene-beta-propiolactone, catalyst, and polymerizable ethylenically unsaturated monomer or monomers present in the reaction mixture or they may be prepared in the presence of a diluent which is inert toward the beta-methylene-beta-propiolactone. It has even been found possible, as shown in Example III, to use water as the diluent, although water is normally reactive with beta-methylene-beta-propiolactone. Examples of suitable diluents are ethers, e. g., diethyl ether, dioxane, and the like, saturated hydrocarbons such as cyclohexane and gasoline, etc. The amount of diluent employed may be varied over wide limits. Usually an amount of diluent is used which is about twice the combined weights of the beta-methylene-beta-propiolactone and polymerizable ethylenically unsaturated compound or compounds.

The copolymers of this invention may be made in glass equipment, or in equipment lined with corrosion-resistant materials such as glass, silver, etc., or they may be made in equipment made of corrosion resistant alloys.

The polymerizable ethylenically unsaturated organic compounds used in the preparation of the copolymers of this invention are the compounds containing the group >C=C< and which, in accord with the present state of the art, are recognized as being capable of undergoing a polymerization reaction involving addition across the ethylenic double bond, which reaction is catalyzed by peroxy compounds. Examples of compounds of this type are ethylene, propylene, the butylenes and vinylidene and vinylene compounds, e. g., vinyl fluoride, vinyl chloride, vinyl acetate, vinylidene fluoride, vinylidene chloride, vinyl propionate, vinyl benzoate, vinyl isobutyrate, methyl vinyl ketone, methyl isopropenyl ketone, methyl acrylate, acrylonitrile, methacrylonitrile, acrylic and methacrylic acids, etc., trifluoroethylene, tetrafluoroethylene, allyl compounds, e. g., allyl ethers and esters, such as, diallyl phthalate, etc., maleic and fumaric acids and their esters, maleic anhydride, etc. Combinations of one or more of the above may be copolymerized with the beta-methylene-beta-propiolactone, if desired. The vinylidene and vinylene compounds are preferred because the most satisfactory results from the standpoint of yield, copolymer quality, and reaction rate are obtained with them. It is understood that the term vinylidene is used herein in the generic sense to include vinyl compounds. It is to be understood also that the term vinylene refers to components having the bivalent radical —CH=CH—. Typical examples of this latter class are maleic and fumaric acids and their esters, maleic anhydride and higher alkenes such as 2-butene.

The properties of the copolymers of this invention vary widely, depending upon the copolymer components and the proportions in which they are used. The copolymers are useful for a wide variety of applications, including unsupported film, adhesives, molded objects, etc. In many instances utility in specific applications may be enhanced by blending them in solution or by milling them with plasticizers, organic or inorganic fillers, pigments, chemical modifying agents, etc. The lactone rings furnish reactive centers which may be opened solvolytically to the hydroxy acids, or the corresponding salts, esters, or amides. Thus, the copolymers of this invention may be modified to afford utility in such diverse applications as surface-active agents, water repellents, waxes, coatings, sizes, paper chemicals, dyeing assistants, etc.

As many apparently widely different embodiments of this invention may be made without departing from the spirit and scope thereof, it is to be understood that I do not limit myself to the specific embodiments thereof except as defined in the appended claims.

I claim:

1. Polymeric material comprising the copolymer of beta-methylene-beta-propiolactone with another copolymerizable organic compound containing ethylenic unsaturation, said copolymer containing lactone units and being free of pyrone rings.

2. The polymeric material defined in claim 1 in which said copolymerizable compound is a vinylidene compound.

3. The polymeric material defined in claim 1 in which said copolymerizable compound is acrylonitrile.

4. The polymeric material defined in claim 1 in which said copolymerizable compound is maleic anhydride.

5. The polymeric material defined in claim 1 in which said copolymerizable compound is vinyl chloride.

6. The polymeric material defined in claim 1 in which said copolymerizable compound is ethylene.

7. The polymeric material defined in claim 1 in which said copolymerizable compound is allyl hexyl ether.

DONALD D. COFFMAN.

REFERENCES CITED

The following references are of record in the file of this patent:

UNITED STATES PATENTS

| Number | Name | Date |
|---|---|---|
| 2,263,598 | Starck et al. | Nov. 25, 1941 |
| 2,487,885 | Magoffin et al. | Nov. 15, 1949 |

OTHER REFERENCES

"Organic Reactions," vol. III, John Wiley & Sons, Inc. (1946), pp. 127–135.

Cavallito et al.: J. A. C. S., vol. 68, November 1946, pp. 2332–2334.

Marvel et al.: J. A. C. S., vol. 61, July 1939, pp. 1682–1684.